Sept. 14, 1954 C. W. MERRILL 2,689,113
FREEZER CONVERTER
Filed Nov. 7, 1952 2 Sheets-Sheet 1
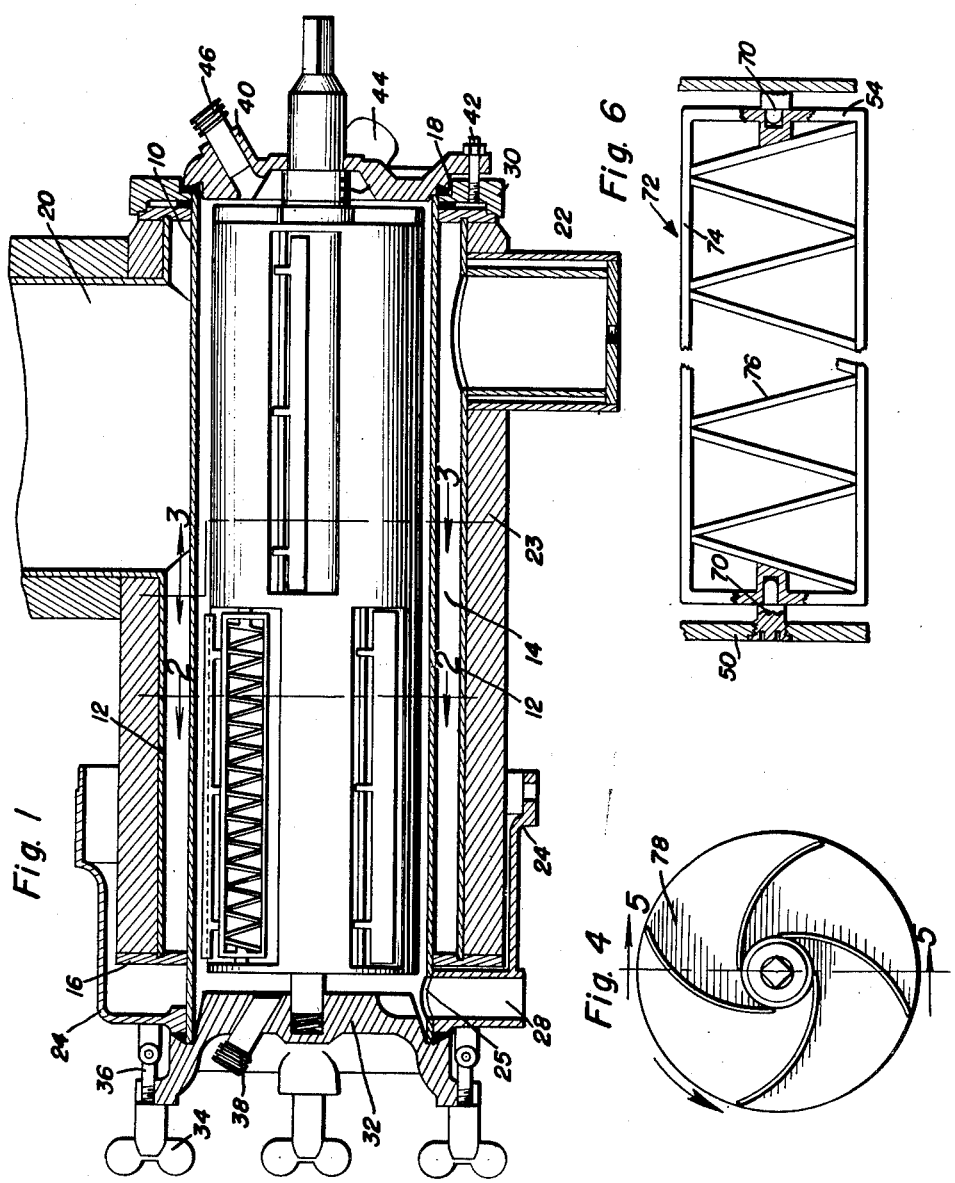
Casper W. Merrill
INVENTOR.

Sept. 14, 1954     C. W. MERRILL     2,689,113
FREEZER CONVERTER
Filed Nov. 7, 1952     2 Sheets-Sheet 2
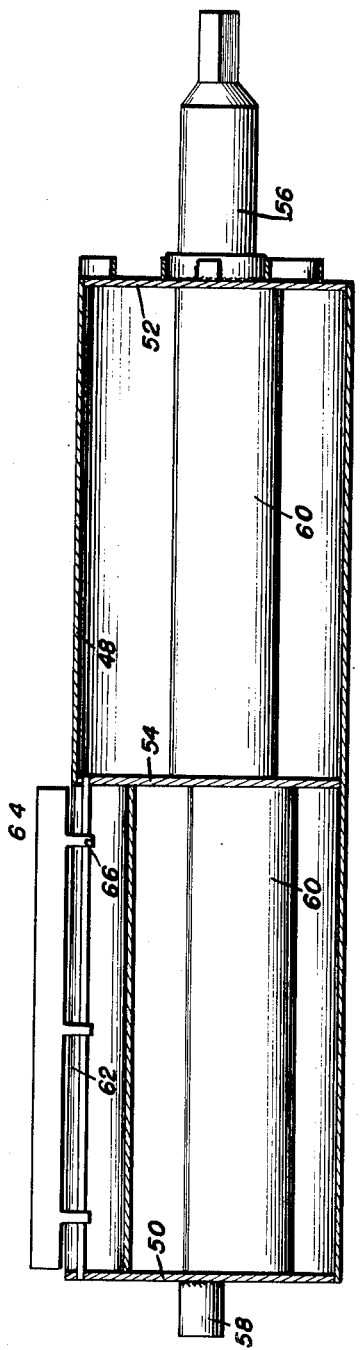
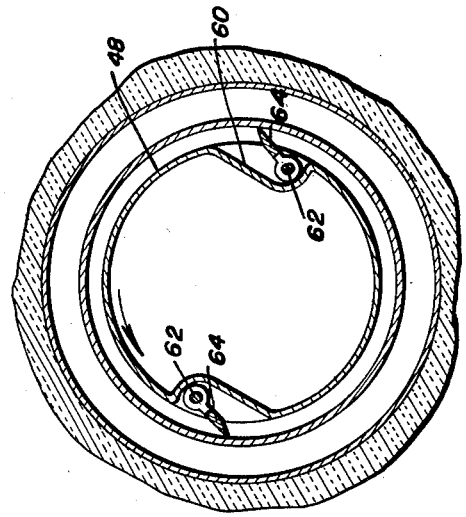
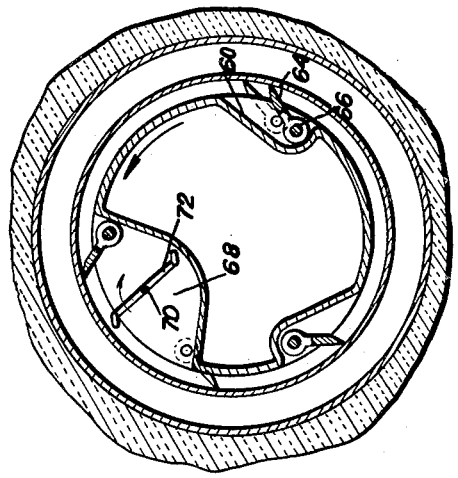
Casper W. Merrill
INVENTOR.

Patented Sept. 14, 1954

2,689,113

UNITED STATES PATENT OFFICE 2,689,113

FREEZER CONVERTER

Casper W. Merrill, Logan, Utah

Application November 7, 1952, Serial No. 319,290

4 Claims. (Cl. 259—5)

This invention relates to ice cream freezers and more particularly to the agitating and whipping means employed in such apparatus. I have disclosed herein, the invention as applied to an ice cream freezer of the continuous type exemplified in U. S. Patent No. 2,538,716 to Alden H. Wakeman, issued January 16, 1951. It is also applicable to other similar apparatus for chilling various food products.

A primary object of this invention is to provide a general folding and stretching or pulling effect on the product to be frozen so that any predetermined amount of air may be absorbed into the mix as it is frozen in the form of very minute cells or pockets to increase the palatability of the product.

A further object of the invention is to provide means permitting the better continuous injection of an air laden mix, the continuous freezing of the mix within the freezing chamber, and the continuous ejection of the frozen product than is possible with a "batch-type" freezer.

One of the important features of the invention resides in the inner closed drum reducing the volume within the cylinder in which the drum is rotated to the extent that only a small amount of mix being frozen can be in the freezer at one time. This drum reduces the amount of mix in the ratio of about 6 to 1 thus allowing the mix to be pumped into the back of the freezer continuously and the frozen product to be drawn out continuously from the front of the freezer.

Another feature of the invention is the offset recesses in the drum which permit the continuous pulling and mixing of the product along its path.

A further feature of the invention is the whipper element which is freely mounted in a recess offset from the recesses of the scraper blades in a manner which permits one edge of the whipper element to pass closer to the freezing wall of the cylinder and thus induce rotation in the whipping blade in an opposite direction to which the drum is being rotated.

Still further objects of the invention reside in the provision of a drum for an ice cream freezer that is simple in construction, strong, durable, easy and inexpensive to manufacture and which can accomplish its functions in an effective manner to yield a product of superior quality.

These, together with the various ancillary objects and features of the invention which will become apparent as the following description proceeds are attained by this freezing equipment, a preferred embodiment of which has been illustrated in the accompanying drawings, by way of example only, wherein:

Figure 1 is a sectional view taken on a vertical plane through the axis of the freezing cylinder of the ice cream freezer embodying the present invention;

Figure 2 is a vertical sectional view as taken along the plane of line 2—2 in Figure 1 and showing the construction of the whipping element in greatest detail;

Figure 3 is a vertical sectional view as taken along the plane of line 3—3 in Figure 1 and showing the manner in which the scraper blades engage the side walls of the cylinder;

Figure 4 is an end elevational view showing the construction of the spiral fins which are used for throwing the mix outwardly onto the side walls of the cylinder, which spiral fins comprise one of the important elements of the invention;

Figure 5 is a vertical sectional view as taken along the plane of line 5—5 in Figure 4 and showing the drum in greatest detail; and, Figure 6 is an enlarged side elevational view of the whipping element, with parts thereof being broken away to show inner parts in greater detail.

With continuing reference to the accompanying drawings wherein like reference numerals designate similar parts throughout the various views, the reference numeral 10 indicates a cylinder within which the ice cream mix is processed. An outer cylinder 12 provides an annular space 14 about the cylinder 10 for the circulation of a refrigerant. A front closure ring 16 and a rear closure ring 18 join the cylinders 10 and 12 in sealing closure of the front and rear ends of the annular space 14. A dome 20 is provided on the upper side of the cylinder 12 in sealed communication with the space 14. The dome 20 serves as a supply receiver for the desired refrigerant. A conventional oil trap 22 is provided at the bottom of the cylinder 12 in communication with the refrigerant space 20. The outer surfaces of the cylinder 12 and dome 22 are covered with conventional insulation 23.

The front end of the cylinder 10 is secured in a front supporting housing 24 which has its lower portion 25 attached to a supporting frame. An outlet port 26 is provided at the bottom end of cylinder 10, the opening 26 being in register with a tubular discharge passage 28 provided in the housing 24. The rear end of the cylinder 10 is secured in a support ring 30, the lower portion of the ring 30 being supported on the supporting frame.

The front end of the cylinder 10 is closed by a removable door 32 secured in position by wing nuts 34 which threadedly engage swingable bolts 36. The bolts 36 are mounted on the housing 24. An inspection tube 38 opening into the cylinder is provided in the door 32. The rear end of the cylinder 10 is closed by a removable head 40 secured in position by bolts 42 extending into the support ring 30. A mix inlet port 44 is provided in the rear head 40. An air inlet 46 is also provided in the rear head 40. Rotatably positioned within the cylinder 10 is a drum having cylindrical sidewalls 48 which are substantially circular in cross section and which are closed by a front end wall 50 and a rear wall 52. A transverse wall 54 may divide the drum into two portions for greater rigidity and for a purpose to be henceforth explained. A stub shaft 56 is provided at the rear of the drum and an element 58 is secured to the front end wall 50 and is journaled in the end wall 32.

The drum is provided with a plurality of recesses 60 in the side walls 48 and these recesses are preferably offset from each other as is shown best in Figure 5. Rotatably mounted on shafts 62 which extend between end walls 50 and 52 and the transverse wall 54 are scraper blades 64 of conventional design. These blades 64 are rotatably mounted on the shaft 62 by means of eyelets 66.

An enlarged recess 68 is formed in the side wall 48 of the drum between the end wall 50 and the transverse wall 54. Rotatably mounted in the recess 68 on a shaft 70 extending between the end wall 60 and the transverse wall 54 is a whipping element 72 which includes a rectangular frame 74 having transverse braces 76. As can be readily seen from an inspection of Figure 6, the shafts 70 are stub shafts and freely permit the whipping element to rotate.

Referring now more particularly to Figures 4 and 5, it will be seen that on the rear wall 52 of the drum there are provided a plurality of spiral blades 78 which are in alignment with the inlet port 44. The spiral 78 provides means for centrifugally directing the mix against the side walls of the cylinder 10.

In operation, the mix comprising the fluid to be frozen is forced into a freezer against the rounded spiral centrifugal fins 78. The rotation of the drum throws the mix against the walls of the cylinder 10 in a thin film. As this film begins to freeze, the scraper blades 64 scrape it loose and it is forced along the cylinder. This partly frozen mix is then pushed against the inner drum to which it tends to adhere. The rotation of the drum gives a gentle pulling action. After it has moved about one-half way along the drum it enters the whipper port or recess 68. The whipper blade is rotated by means of the resistance against the harder frozen mix and thus rotates in a direction opposite to the direction of rotation of the drum. Any mixture that is not already homogeneous is now thoroughly mixed with a gentle folding action. The recess 68 allows for free operation of the whipping blade. The recesses 60 in the drum allow for free operation of the scraper blades and the bypassing of some of the frozen mixture. By decreasing the amount of mix that can be placed into the cylinder, the smaller amount of mix may be more readily frozen and it may be done so in a continuous manner. Thus, there is provided the continuous air injection into a mix, the continuous freezing of the mix in the freezing chamber and the continuous ejection of the more stiffly frozen product than is possible with a mixer which mixes a larger batch at one time.

Since from the foregoing the construction and advantages of this freezing device are readily apparent, further description is believed to be unnecessary.

However, since numerous modifications will readily occur to those skilled in the art after a consideration of the foregoing specification and accompanying drawings, it is not intended to limit the invention to a precise embodiment shown and described, but all suitable modifications and equivalents may be readily resorted to. Obviously, certain applications of the invention can be undertaken without the use of the whipping element. Further, the drum may be made with a slight tapering effect from the rear to the front.

What is claimed as new is as follows:

1. In a freezing apparatus having a freezing cylinder and having an inlet port to said cylinder for reception of fluid to be frozen and mixed, and having an outlet port for discharge of the frozen product, a drum rotatably mounted in said cylinder, said drum substantially filling said cylinder, means mounted on said drum adjacent said inlet port for centrifugally urging said fluid against said cylinder, recesses in said drum, and blades rotatably mounted in said recesses, said blades having scraping contact with said cylinder when said drum is rotated, another recess in said drum offset from said first recited recesses, and a whipping element freely rotatably mounted in said another recess, said whipping element not engaging said cylinder.

2. In a freezing apparatus having a freezing cylinder and having an inlet port to said cylinder for reception of fluid to be frozen and mixed and having an outlet port for discharge of the frozen product, a drum rotatably mounted in said cylinder substantially filling said cylinder, said drum having cylindrical side walls substantially circular in cross section, end walls closing said drum secured to said side walls, means mounted on one of said side walls adjacent said inlet port for centrifugally urging said fluid against said cylinder, recesses in said drum, and blades rotatably mounted in said recesses, said blades having scraping contact with said cylinder when said drum is rotated, another recess in said drum offset from said first recited recesses, and a whipping element freely rotatably mounted on its longitudinal axis in said another recess, said whipping element being disposed in said recess so as to prevent engagement with said cylinder.

3. In a freezing apparatus having a freezing cylinder and having an inlet port to said cylinder for reception of fluid to be frozen and mixed, and having an outlet port for discharge of the frozen product, a drum rotatably mounted in said cylinder, said drum substantially filling said cylinder, spiral fins mounted on said drum adjacent said inlet port for centrifugally urging said fluid against said cylinder, recesses in said drum, and blades rotatably mounted in said recesses, said blades having scraping contact with said cylinder when said drum is rotated, another recess in said drum offset from said first recited recesses, and a whipping element freely rotatably mounted on its longitudinal axis in said another recess, said whipping element being disposed in said recess so as to prevent engagement with said cylinder.

4. In a freezing apparatus having a freezing cylinder and having an inlet port to said cylinder for reception of fluid to be frozen and mixed and having an outlet port for discharge of the frozen product, a drum rotatably mounted in said cylinder substantially filling said cylinder, said drum having cylindrical side walls substantially circular in cross section, end walls closing said drum secured to said side walls, spiral fins mounted on one of said end walls adjacent said inlet port for centrifugally urging said fluid against said cylinder, recesses in said drum, and blades mounted in said recesses, said blades having scraping contact with said cylinder when said drum is rotated, another recess in said drum offset from said first recite recesses, and a whipping element freely rotatably mounted on its longitudinal axis in said another recess, said whipping element being disposed in said recess so as to prevent engagement with said cylinder.

References Cited in the file of this patent

UNITED STATES PATENTS

| Number | Name | Date |
|---|---|---|
| 488,995 | Frick | Jan. 3, 1893 |
| 2,266,032 | Harrington | Dec. 16, 1941 |
| 2,281,944 | Miller | May 5, 1942 |
| 2,538,716 | Wakeman | Jan. 16, 1951 |
| 2,589,350 | Edmunds | Mar. 18, 1952 |
| 2,610,478 | Lofstedt | Sept. 16, 1952 |